United States Patent Office 3,116,967
Patented Jan. 7, 1964

3,116,967
CREASEPROOFING COMPOSITIONS FOR TEXTILES
Herman B. Goldstein, Cranston, Michael A. Silvestri, Providence, and John V. Simonian, Greenwood, R.I., assignors to Sun Chemical Corporation, Long Island City, N.Y., a corporation of Delaware
No Drawing. Filed Jan. 9, 1958, Ser. No. 707,876
7 Claims. (Cl. 8—115.6)

This invention relates to creaseproofing compositions for textiles and more particularly to compositions containing a crosslinking agent for cellulose, a catalyst to promote such crosslinking and which may contain a synergist for said crosslinking agent.

The creaseproofing or cellulosic textiles by the application of a potential resin or crosslinking agent and the subsequent curing of the resin or agent is known. Many resins and crosslinking agents have been proposed, principally aminoplast compositions derived from aldehydes and urea, melamine, etc., and derivatives thereof. The material is applied to the fabric in the form of an aqueous solution or dispersion containing a catalyst which liberates an acid on the application of heat to cure the resin and/or crosslink with the cellulose.

The prior art padding solutions were unstable due to the tendency of the resin forming material to polymerize in the solution and therefore had to be prepared immediately before use.

It is among the objects of the present invention to provide potentially reactive creaseproofing composition for textiles in the form of a stable, concentrated solution or dispersion which may be stored for long periods of time without polymerization or decomposition.

Another object of the invention is to provide a concentrated creaseproofing composition which need only be diluted with water for application to textiles.

Another object is to prepare a concentrated creaseproofing composition which is of known concentration and which, when diluted, produces an impregnating composition which is uniform from batch to batch.

Another object of the invention is to provide a creaseproofing composition, which, in use, produces more durable creaseproofing and which produces more abrasion resistant fabrics.

Another object of the invention is to provide a creaseproofing composition which imparts greater tear strength to fabrics treated therewith.

The compositions of the present invention comprise stable aqueous concentrates containing a difunctional heterocyclic creaseproofing agent, a latent acidic catalyst and a textile lubricant synergist. The concentrate may also contain dispersing agents to aid in the preservation of a stable dispersion.

The difunctional crosslinking agent is a compound selected from the group consisting of dimethylolated N-heterocyclic compounds and lower alkyl ethers thereof. These compounds are not self-polymerizing; that is, they have little tendency to condense with themselves to form resinous polymers. On the other hand, they readily react with the hydroxyl groups of cellulose to crosslink the same.

Suitable difunctional crosslinking agents include dimethylol ethylene urea, 1,3-dimethylol-4,5 dihydroxy imidazolidone - 2, 1 - substituted - 3,5 - dimethylol - 2,6-dihydrotriazin-4-ones, N,N'-dimethylol uron, dimethylol-1,2-propylene urea, dimethylol ethylene thiourea, dimethylol-1,3-propylene urea and lower alkyl ethers thereof such as methyl, ethyl, propyl, etc. The compounds may be illustrated thus:

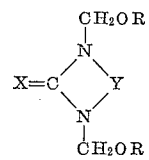

where X is oxygen or sulfur, R is hydrogen or lower alkyl and Y is a divalent organic radical of chain length of 2 or 3, the terminal atoms being carbon and which may include hydroxy or hydrocarbon substituents and any other atom in the chain being carbon, oxygen, sulfur or nitrogen. Typical suitable crosslinking agents include:

Dimethylol cyclic ethylene urea
Dimethoxymethyl cyclic ethylene urea
1,3 dimethylol-4,5-dihydroxy imidazolidone-2
1,3 dimethoxymethyl-4,5-dihydroxy imidazolidone-2
1-methyl-3,5-dimethylol-2,6-dihydrotriazin-4-one
1-methyl-3,5-dimethoxymethyl-2,6-dihydrotriazin-4-one
1-ethyl-3,5-dimethylol-2,6-dihydrotriazin-4-one
1-isopropyl-3,5-dimethylol-2,6-dihydrotriazin-4-one
1-m-butyl-3,5-dimethylol-2,6-dihydrotriazin-4-one
1-cyclohexyl-3,5-dimethoxymethyl-2,6-dihydrotriazin-4-one
1-benzyl-3,5-dimethylol-2,6-dihydrotriazin-4-one
1-hydroxyethyl-3,5-dimethylol-2,6-dihydrotriazin-4-one
1-chloromethyl-3,5-dimethylol-2,6-dihydrotriazin-4-one
N,N'-dimethylol uron
N,N'-dimethoxymethyl uron
Dimethylol-1,2-propylene urea
Dimethoxymethyl-1,2-propylene urea The above crosslinking agents are normally prepared in aqueous solution and may contain by-products and impurities. For the purposes of this invention, it is not necessary that the pure compounds be employed; the crude compounds as prepared may be used.

The crosslinking agent is present in the concentrate in an amount from 20% to 60% by weight, preferably from 37.5% to 60% by weight of the aqueous concentrate.

The latent acidic catalyst of the composition is a compound which releases an acid at the curing temperatures employed in creaseproofing fabrics, generally about 250° to 400° F. Suitable catalysts include:

2-amino-2-methyl-1-propanol hydrochloride
2-amino-2-methyl-1-propanol phosphate
Monoethanolamine hydrochloride
2-amino-1-butanol phosphate
Triethanolamine phosphate
Diethanolamine hydrochloride
1-amino-2-methyl-2-butanol phosphate
1-amino-2-methyl-1-butanol hydrochloride
3-amino-2-methyl-1-butanol hydrochloride
Diammonium phosphate
Ammonium chloride The amount of latent catalyst in the concentrate necessary to crosslink the agent on the fabric is in the range of 1 to 10% by weight of the crosslinking agent. It is preferred, however, to include an excess of catalyst in the concentrate, for frequently hand modifying resins are added to the impregnating solution and additional catalyst is required to cure such resin. Accordingly, the concentrate preferably contains from 1–15% catalyst by weight.

The crosslinking synergist is an emulsion of polyethylene, polyethylene waxes, petroleum wax, acrylic resin and the like. It has been found that such lubricants exhibit a synergistic effect on the crosslinking agent; e.g., a mixture of crosslinking agent and such a lubricant yields greater crease resistance than does an amount of crosslinking agent equal to the amount of the mixture. In addition, fabrics treated with such creaseproofing compositions exhibit greater tear strength and abrasion resistance.

The amount of lubricant in the concentrate is between 1 and 15% by weight of the concentrate.

One or more dispersing agents are required to maintain a stable dispersion or emulsion of the lubricant in the concentrate. The dispersing agents are preferably non-ionic in nature, such as polyethoxy-substituted phenols, hexahydric alcohol-ethylene oxide condensation products and the like. The dispersing agent or agents normally comprise from 0.01 to 2.5% by weight of the concentrate.

The concentrate is indefinitely stable, provided the pH is not below 5. Alkali may be added to bring the pH up. The preferred pH range is pH 6–7.

In use, the concentrate is diluted to give about 3% to 15% by weight of crosslinking agent and is applied to cellulosic fabrics, as by padding. The fabric is then dried and cured at about 250° to 400° F. according to techniques known in the art.

*Example I*

A stable concentrate was prepared containing the following (all percentages by weight):

| | Percent |
|---|---|
| Dimethylol cyclic ethylene urea (50% aqueous solution) | 75 |
| Emulsifiable polyethylene wax | 3.00 |
| Polyethoxy nonyl phenol | 1.00 |
| 2-amino-2-methyl-1-propanol hydrochloride | 5.25 |
| Water | 15.75 |

The mixture was agitated until a stable emulsion resulted. The pH of the mixture was adjusted to 6.8 with sodium hydroxide. The concentrate was indefinitely stable. It was diluted with water to a 7% ethylene urea concentration, applied to cotton and cured in the usual manner, resulting in a durable crease resistant fabric.

*Example II*

The following concentrate was prepared as in Example I:

| | Percent |
|---|---|
| 1-ethyl-3,5-dimethylol-2,6-dihydrotriazin-4-one (60% aqueous solution) | 70 |
| Emulsifiable microcrystalline wax | 7.5 |
| Polyethoxy nonyl phenol | 1.25 |
| 2-amino-1-butanol phosphate | 4.00 |
| Water | 17.25 |

The concentrate, which is stable, was diluted to 5% crosslinking agent and applied to cotton, dried and cured to yield a creaseproof fabric.

*Example III*

| | Percent |
|---|---|
| 1-isopropyl-3,5-dimethoxymethyl-2,6-dihydrotriazin-4-one (60% aqueous solution) | 50 |
| Acrylic resin emulsion | 5 |
| Sorbitol-ethylene oxide condensate | 1 |
| Diammonium phosphate | 3 |
| Water | 41 |

The above concentrate was stable, and when diluted to 5% crosslinking agent was applied viscose rayon, dried and cured to yield a crease proof fabric.

*Example IV*

| | Percent |
|---|---|
| 1,3-dimethoxymethyl-4,5-dihydroxy imidazolidone-2 (50% aqueous solution) | 80 |
| Polyethylene wax | 10 |
| Polyethoxy nonyl phenol | 1.5 |
| 2-amino-2-methyl-1-propanol hydrochloride | 7 |
| Water | 1.5 |

The above stable concentrate was diluted to 7% crosslinking agent, applied to cotton, dried and cured to yield a creaseproof fabric.

While the invention has been described in terms of certain examples, such examples are to be considered illustrative rather than limiting, and it is intended to cover all modifications and embodiments that fall within the spirit and scope of the appended claims.

What is claimed is:

1. A stable aqueous concentrate of a cellulosic textile crease-proofing agent having a pH of from about 5 to 7, comprising from 37.5 to 60 percent by weight of a difunctional cross-linking agent selected from the group consisting of dimethylol cyclic ethylene urea, 1-ethyl-3,5-dimethylol-2,6-dihydrotriazin-4-one, 1-isopropyl-3,5-dimethylol-2,6-dihydrotriazin-4-one, 1,3-dimethylol-4,5-dihydroxy imidazolidone-2 and alkyl esters thereof, from 3 to 10 percent by weight of emulsifiable textile lubricant selected from the group consisting of polyethylene waxes and acrylic resins, from 3 percent to 7 percent by weight of a latent acidic catalyst, from 1 to 1.5 percent by weight of a non-ionic organic surface-active wetting agent for said lubricant and the remainder water.

2. The composition set forth in claim 1 wherein said cross-linking agent is dimethylol cyclic ethylene urea.

3. The composition set forth in claim 1 wherein said cross-linking agent is 1-ethyl-3,5-dimethylol-2,6-dihydrotriazin-4-one.

4. The composition set forth in claim 1 wherein said cross-linking agent is 1,3-dimethoxymethyl-4,5-dihydroxy imidazolidone-2.

5. The composition set forth in claim 1 wherein said latent catalyst is 2-amino-2-methyl-1-propanol hydrochloride.

6. The composition set forth in claim 1 wherein said textile lubricant is an emulsifiable polyethylene wax.

7. The composition as set forth in claim 1 wherein said textile lubricant is an emlusifiable microcrystalline wax.

References Cited in the file of this patent

UNITED STATES PATENTS

| 2,166,325 | Rein | July 18, 1939 |
|---|---|---|
| 2,200,931 | Moore | May 14, 1940 |
| 2,609,350 | Spatt | Sept. 2, 1952 |
| 2,690,404 | Spangler | Sept. 28, 1954 |
| 2,731,364 | Reibnitz | Jan. 17, 1956 |
| 2,755,198 | Stewart | July 17, 1956 |
| 2,795,513 | Rossin | June 11, 1957 |
| 2,804,402 | Williams | Aug. 27, 1957 |
| 2,810,624 | Wardell | Oct. 22, 1957 |
| 2,911,326 | Haney | Nov. 3, 1959 |
| 2,926,062 | Gagliardi | Feb. 23, 1960 |

FOREIGN PATENTS

| 537,971 | Great Britain | July 16, 1941 |
|---|---|---|
| 148,368 | Australia | Sept. 24, 1952 |

OTHER REFERENCES

Chemistry and Technology of Waxes, by A. M. Warth (2nd Edition), Reinhold Publishing Corp., New York, New York, 1956, page 533. Copy in Scientific Library.